US009964060B2

(12) United States Patent
Yagi et al.

(10) Patent No.: US 9,964,060 B2
(45) Date of Patent: *May 8, 2018

(54) CONTROL DEVICE FOR ENGINE

(71) Applicant: Mazda Motor Corporation, Aki-gun, Hiroshima (JP)

(72) Inventors: Atsushi Yagi, Hiroshima (JP); Kenji Sasaki, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 64 days.

This patent is subject to a terminal disclaimer.

(21) Appl. No.: 15/159,702

(22) Filed: May 19, 2016

(65) Prior Publication Data

US 2016/0341139 A1 Nov. 24, 2016

(30) Foreign Application Priority Data

May 22, 2015 (JP) .................. 2015-104639

(51) Int. Cl.
*F02D 1/00* (2006.01)
*F02D 41/10* (2006.01)
(Continued)

(52) U.S. Cl.
CPC ............. *F02D 41/10* (2013.01); *F02D 29/02* (2013.01); *F02D 41/0225* (2013.01);
(Continued)

(58) Field of Classification Search
CPC ........ B60W 2510/0619; F02B 19/1052; F02D 2700/02; F02D 19/025; F02D 2011/103;
(Continued)

(56) References Cited

U.S. PATENT DOCUMENTS 5,470,289 A   11/1995  Pioch et al.
7,291,092 B2  11/2007  Tohta et al.
(Continued)

FOREIGN PATENT DOCUMENTS

JP   2005155412 A   6/2005
JP   2005301441 A   10/2005
(Continued)

OTHER PUBLICATIONS

Japan Patent Office, Office Action Issued in Japanese Application No. 2015-104637, dated Feb. 3, 2017, 5 pages.

*Primary Examiner* — John Kwon
(74) *Attorney, Agent, or Firm* — Alleman Hall Creasman & Tuttle LLP

(57) ABSTRACT

A control device for an engine is provided. The control device includes an accelerator opening detector for detecting an opening of an accelerator, a target acceleration setter for setting a target acceleration of a vehicle based on the detected accelerator opening, and an engine controller for adjusting an engine torque to achieve the set target acceleration. The target acceleration setter sets the target acceleration such that a characteristic of a change of a jerk produced in the vehicle due to a reduction of the accelerator opening correlates to a characteristic of a change of a jerk produced in the vehicle due to an increase of the accelerator opening, the increase of the accelerator opening performed in an early half of a process of acceleration to a constant speed travel of the vehicle, the reduction of the accelerator opening performed in a latter half of the process.

6 Claims, 13 Drawing Sheets

(51) Int. Cl.
*F02D 29/02* (2006.01)
*F02D 41/02* (2006.01)

(52) U.S. Cl.
CPC .. *F02D 2200/501* (2013.01); *F02D 2200/602* (2013.01); *F02D 2250/18* (2013.01); *F02D 2250/26* (2013.01); *F02D 2250/28* (2013.01)

(58) Field of Classification Search
CPC .......... F02D 31/004; F02D 2009/0205; F02D 2200/0404; F02D 31/002; F02D 31/001; F02D 31/006; F02D 31/008; Y02T 10/42
USPC ..... 701/101, 103, 104, 114; 123/319, 339.1, 123/339.14, 360, 379, 391, 403, 406.52
See application file for complete search history.

(56) References Cited

U.S. PATENT DOCUMENTS

| | | | |
|---|---|---|---|
| 9,073,534 | B2 | 7/2015 | Okada et al. |
| 2002/0189563 | A1 | 12/2002 | Muraki et al. |
| 2005/0215393 | A1 | 9/2005 | Shimoda |
| 2006/0040790 | A1 | 2/2006 | Tohta et al. |
| 2011/0029209 | A1 | 2/2011 | Hattori et al. |
| 2011/0271788 | A1 | 11/2011 | Kawai |
| 2012/0234128 | A1 | 9/2012 | Ohtsubo et al. |
| 2012/0285287 | A1 | 11/2012 | Sakaguchi et al. |
| 2014/0011638 | A1 | 1/2014 | Iwaki |
| 2016/0258364 | A1* | 9/2016 | Takeyoshi ............... F02D 11/02 |
| 2016/0258365 | A1* | 9/2016 | Takeyoshi ............. F02D 11/105 |
| 2016/0273469 | A1* | 9/2016 | Takeyoshi ............... F02D 41/10 |
| 2016/0339780 | A1* | 11/2016 | Yagi ....................... B60K 26/02 |
| 2016/0341139 | A1* | 11/2016 | Yagi ....................... F02D 41/10 |

FOREIGN PATENT DOCUMENTS

| | | |
|---|---|---|
| JP | 2005343422 A | 12/2005 |
| JP | 2006117020 A | 5/2006 |
| JP | 2006177442 A | 7/2006 |
| JP | 2008239130 A | 10/2008 |
| JP | 5499882 B | 5/2014 |
| JP | 2015017570 A | 1/2015 |
| WO | WO2010086965 A1 | 7/2012 |

* cited by examiner

CONTROL DEVICE FOR ENGINE

BACKGROUND

The present invention relates to a control device for an engine, particularly to a control device for an engine, which controls an engine torque according to operation of an accelerator pedal performed by a driver.

Conventionally, engines of vehicles are controlled in consideration of a jerk (a rate of change (derivative value) of an acceleration per unit time, also referred to as a jolt, surge, or lurch) produced in the vehicles. For example, JP5499882B2 discloses an art of controlling an engine torque to maximize a jerk produced in a vehicle when an actual torque reaches a predetermined ratio (e.g., between 70 and 80 percent) with respect to a target torque which is set based on an operation amount of an accelerator pedal of the vehicle. With this art, the actual torque is greatly increased to provide a driver of the vehicle with an acceleration feel corresponding to the operation state of the accelerator pedal.

Meanwhile, with the conventional art, the acceleration feel is increased by the control taking into consideration the jerk produced during acceleration of the vehicle, and the control is not performed by taking into consideration a jerk produced during deceleration of the vehicle. It can be considered that by controlling the engine such that the jerk produced during deceleration of the vehicle correlates to the jerk produced during acceleration of the vehicle (e.g., controlling the engine such that a change mode of the jerk produced during deceleration becomes similar to a change mode of the jerk produced during acceleration), the acceleration feel and a deceleration feel, which are provided to the driver, are made to match each other, and a unity between the driver and the vehicle (a feeling akin to the "unity between a horse and its rider") improves.

SUMMARY

The present invention is made in view of solving the problems of the conventional art described above, and aims to provide a control device for an engine, which performs a control by taking into consideration a jerk produced during deceleration of a vehicle, so as to match an acceleration feel with a deceleration feel provided to a driver and improve a unity between the driver and the vehicle.

According to one aspect of the present invention, a control device for an engine is provided. The control device includes a processor configured to execute an accelerator opening detector for detecting an opening of an accelerator, a target acceleration setter for setting a target acceleration of a vehicle based on the accelerator opening detected by the accelerator opening detector, and an engine controller for adjusting an engine torque to achieve the target acceleration set by the target acceleration setter. The target acceleration setter sets the target acceleration such that a characteristic of a change of a jerk produced in the vehicle due to a reduction of the accelerator opening correlates to a characteristic of a change of a jerk produced in the vehicle due to an increase of the accelerator opening, the increase of the accelerator opening performed in an early half of a process of acceleration to a constant speed travel of the vehicle, the reduction of the accelerator opening performed in a latter half of the process.

The characteristic of the change of the jerk produced due to the reduction of the accelerator opening may correlate to the characteristic of the change of the jerk produced due to the increase of the accelerator opening in a mode in which the changes of the jerks are similar to each other in a time axis while directions of the changes perpendicular to the time axis are opposite to each other.

With this configuration, the characteristic of the change of the jerk produced due to the reduction of the accelerator opening is made to correlate to the characteristic of the change of the jerk produced due to the increase of the accelerator opening (e.g., the characteristics of the changes of the jerks are made to be similar to each other). Therefore, an acceleration feel and a deceleration feel provided to a driver can be matched with each other, and a unity between the driver and the vehicle can be improved.

The control device may also include a limiter for limiting the jerk produced in the vehicle not to exceed a predetermined value of the jerk, when the accelerator opening reduces.

With this configuration, when the accelerator opening reduces, in a control of an engine torque by using the target acceleration which is set based on the accelerator opening, the jerk produced in the vehicle (an absolute value of the jerk) is limited not to exceed a predetermined value of the jerk. Therefore, sharp deceleration is suppressed and a response in transition of the deceleration can be improved, and additionally, the characteristic of the change of the jerk when the accelerator opening reduces can be made to correlate more to the characteristic of the change of the jerk when the accelerator opening increases.

The limiter may be executed by the processor. The engine controller may limit a change of an engine torque that is caused according to the target acceleration set by the target acceleration setter, to prevent the jerk produced in the vehicle when the accelerator opening reduces from exceeding the predetermined value.

With this configuration, by limiting the change of the engine torque according to the target acceleration set by the target acceleration setter, the jerk produced in the vehicle when the accelerator opening reduces can suitably be controlled to be less than the predetermined value.

The engine controller may set a limit value for a change amount of the engine torque based on a current engine torque and a change amount of the engine torque within a predetermined period of time, and the engine controller may limit the change of the engine torque by using the limit value.

With this configuration, by using the limit value for limiting the change of the engine torque according to the current engine torque and the change amount of the engine torque within the predetermined time period, the jerk produced in the vehicle when the accelerator opening reduces can surely be controlled to be less than the predetermined value.

According to another aspect of the present invention, a control device for an engine is provided. The control device includes a processor configured to execute an accelerator opening detector for detecting an opening of an accelerator, a target acceleration setter for setting a target acceleration of a vehicle based on the accelerator opening detected by the accelerator opening detector, and an engine controller for adjusting an engine torque to achieve the target acceleration set by the target acceleration setter. The target acceleration setter sets the target acceleration such that a characteristic of a change of a jerk produced in the vehicle due to a reduction of the accelerator opening correlates to a characteristic of a change of a jerk produced in the vehicle due to an increase of the accelerator opening, the target acceleration set to cause the jerk, when the accelerator opening is increased from a state where the target acceleration is set to zero: to increase to a predetermined highest value at a first change rate as the accelerator opening increases; to substantially be fixed regardless of an increase of the accelerator opening within a predetermined range of the accelerator opening exceeding an accelerator opening at which the jerk reaches the highest value; and to reduce at a second change rate as the accelerator opening increases above the predetermined range, the second change rate being lower than the first change rate.

By changing the jerk according to the increase of the accelerator opening as above, during the acceleration of the vehicle, both a quick acceleration feel and a linear acceleration feel can suitably be obtained. According to this configuration, the characteristic of the change of the jerk produced when the accelerator opening reduces can suitably be made to correlate to the characteristic of the change of the jerk produced when the accelerator opening increases, which achieves both the quick acceleration feel and the linear acceleration feel.

DETAILED DESCRIPTION OF EMBODIMENT

Hereinafter, a control device for an engine according to one embodiment of the present invention is described with reference to the appended drawings.

<System Configuration>

Figure 1:
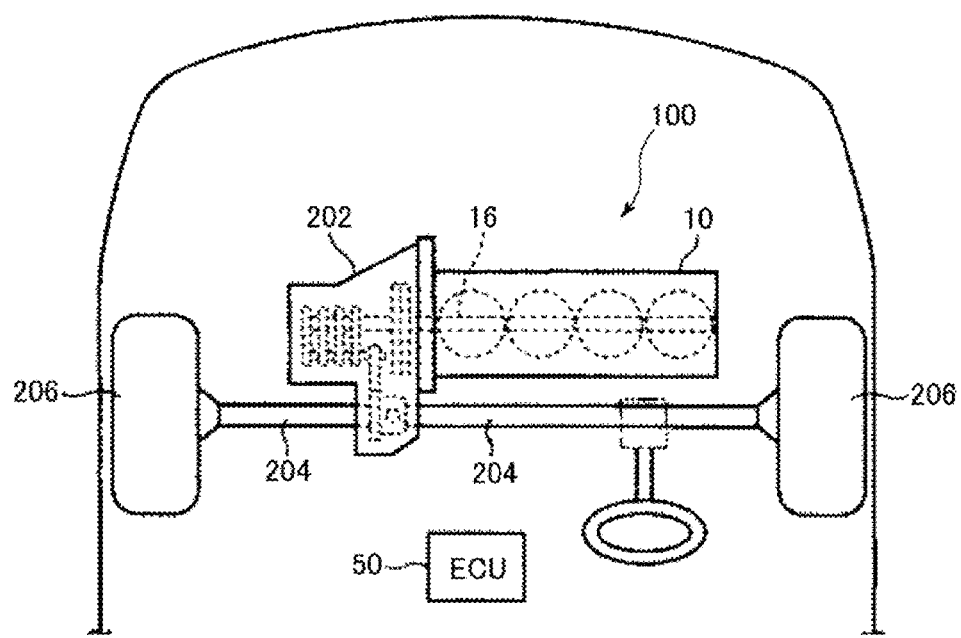
FIG. 1 is a plan view illustrating a schematic configuration of a vehicle to which a control device for an engine according to one embodiment of the present invention is applied.
Figure 2:
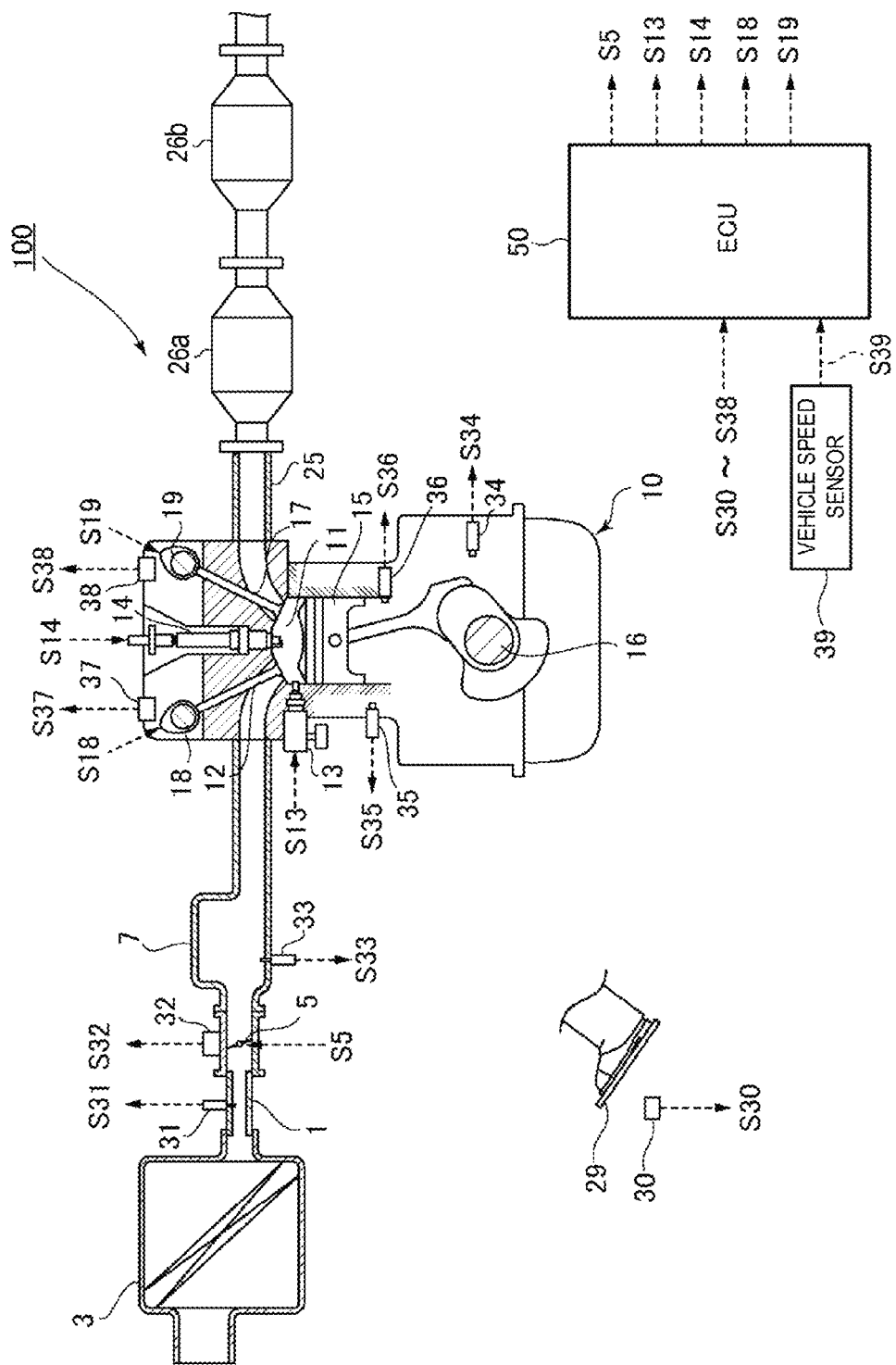
FIG. 2 is a view illustrating a schematic configuration of an engine system to which the control device for the engine according to the embodiment of the present invention is applied.

First, an engine system to which the control device for the engine of this embodiment is applied is described with reference to FIGS. 1 and 2. FIG. 1 is a plan view illustrating a schematic configuration of a vehicle to which the control device for the engine according to this embodiment is applied. FIG. 2 is a view illustrating a schematic configuration of the engine system to which the control device for the engine according to this embodiment is applied.

As illustrated in FIG. 1, in the vehicle, the engine 10 of the engine system 100 produces an engine torque (drive torque) as a thrust of the vehicle by causing combustion of mixture gas containing fuel and air, and transfers the engine torque to a transmission 202 via a crankshaft 16. The transmission 202 changes a gear position among a plurality of positions (e.g., first to sixth ranges), and at a gear position set by the transmission 202, the engine torque from the engine 10 is transferred, via a pair of drive shafts 204, to a pair of wheels 206 attached to outer end parts of the drive shafts 204 in vehicle width directions, respectively. For example, the transmission 202 is a manual transmission of which gear position is selected by a driver of the vehicle at the driver's discretion. Further, the vehicle of this embodiment is a sports car, for example.

Further, in the vehicle, an ECU (Electronic Control Unit) 50 performs various controls within the vehicle. In this embodiment, the ECU 50 functions as the control device of the engine. According to operation of an accelerator pedal (accelerator) by the driver, the ECU 50 controls the engine torque which is outputted by the engine 10, and supplies the engine torque to the vehicle. Thus, a desired acceleration characteristic in relation to the accelerator operation can be achieved.

As illustrated in FIG. 2, the engine system 100 includes an intake passage 1 through which intake air (air) introduced from outside passes, the engine (specifically, a gasoline engine) 10 for producing a drive force of the vehicle by causing combustion of the mixture gas containing the intake air supplied from the intake passage 1 and the fuel supplied from a fuel injector 13 (described later), an exhaust passage 25 through which exhaust gas produced by the combustion within the engine 10 is discharged, sensors 30 to 39 for detecting various states regarding the engine system 100, and the ECU 50 for controlling the engine system 100 entirely.

The intake passage 1 is provided with, from its upstream side in the following order, an air cleaner 3 for purifying the intake air introduced from outside, a throttle valve 5 for adjusting an amount of intake air passing therethrough (intake air amount), and a surge tank 7 for temporarily storing the intake air to be supplied to the engine 10.

The engine 10 mainly includes an intake valve 12 for introducing, into a combustion chamber 11, the intake air supplied from the intake passage 1, the fuel injector 13 for injecting the fuel to the combustion chamber 11, an ignition plug 14 for igniting the mixture gas (containing the intake air and the fuel) supplied into the combustion chamber 11, a piston 15 for reciprocating due to the combustion of the mixture gas within the combustion chamber 11, the crankshaft 16 which is rotated in conjunction with the reciprocation of the piston 15, and an exhaust valve 17 for discharging, to the exhaust passage 25, the exhaust gas produced by the combustion of the mixture gas within the combustion chamber 11.

Moreover, the engine 10 varies operation timings of the intake and exhaust valves 12 and 17 (corresponding to phases of the valves) by a variable intake valve mechanism 18 and a variable exhaust valve mechanism 19 (both being a variable valve timing mechanism), respectively. Various known types may be applied for the variable intake valve mechanism 18 and the variable exhaust valve mechanism 19, and for example, an electromagnetic type mechanism or a hydraulic type mechanism may be used to change the operation timings of the intake and exhaust valves 12 and 17.

The exhaust passage 25 is mainly provided with exhaust gas purifying catalysts 26a and 26b having a function of purifying the exhaust gas, such as an NOx catalyst, a three-way catalyst, or an oxidation catalyst. Hereinafter, when the exhaust gas purifying catalysts 26a and 26b are not differentiated, they may each simply be described as the "exhaust gas purifying catalyst 26."

Further, the engine system 100 is provided with the sensors 30 to 39 for detecting the various states regarding the engine system 100. The sensors 30 to 39 are specifically as follows: the accelerator opening sensor 30 for detecting a position of the accelerator pedal 29 (corresponding to an amount by which the driver depresses the accelerator pedal 29); the airflow sensor 31 for detecting the intake air amount corresponding to the flow rate of the intake air passing through the intake passage 1; the throttle opening sensor 32 for detecting an opening of the throttle valve 5 (throttle opening); the pressure sensor 33 for detecting intake manifold pressure corresponding to pressure of the intake air which is supplied to the engine 10; the crank angle sensor 34 for detecting a crank angle of the crankshaft 16; the water temperature sensor 35 for detecting a temperature of cooling water for cooling the engine 10 (water temperature); the temperature sensor 36 for detecting a temperature inside a cylinder of the engine 10 (in-cylinder temperature); the cam angle sensors 37 and 38 for detecting the operation timings (including close timings) of the intake and exhaust valves 12 and 17, respectively; and the vehicle speed sensor 39 for detecting the speed of the vehicle (vehicle speed). These various sensors 30 to 39 output respective detection signals S30 to S39 corresponding to the detected parameters, to the ECU 50.

The ECU 50 controls the components of the engine system 100 based on the detection signals S30 to S39 received from the various sensors 30 to 39 described above. Specifically, the ECU 50 supplies a control signal S5 to the throttle valve 5 to adjust open and close timings of the throttle valve 5 and the throttle opening, supplies a control signal S13 to each fuel injector 13 to adjust a fuel injection amount and a fuel injection timing, supplies a control signal S14 to each ignition plug 14 to adjust an ignition timing, and supplies control signals S18 and S19 to the variable intake valve mechanism 18 and the variable exhaust valve mechanism 19 to adjust the operation timings of the intake and exhaust valves 12 and 17, respectively.

Figure 3:
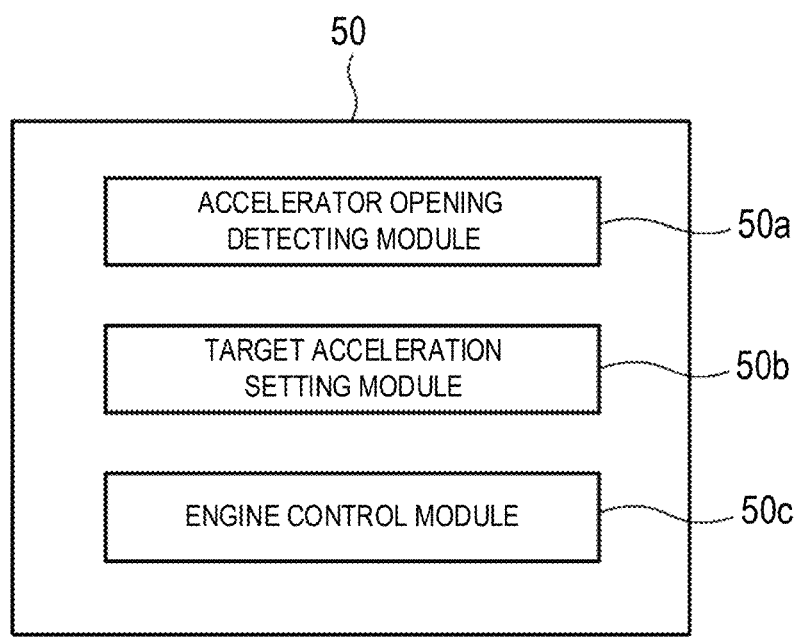
FIG. 3 is a block diagram illustrating a functional configuration of an electronic control unit (ECU) according to the embodiment of the present invention.

Next, a functional configuration of the ECU 50 of this embodiment is described with reference to FIG. 3. As illustrated in FIG. 3, the ECU 50 of this embodiment executes an accelerator opening detecting module 50a (e.g., an accelerator opening detector), a target acceleration setting module 50b (e.g., a target acceleration setter), and an engine control module 50c (e.g., an engine controller).

The accelerator opening detecting module 50a acquires the accelerator opening (e.g., expressed in "%") based on the detection signal S30 outputted by the accelerator opening sensor 30.

The target acceleration setting module 50b sets a target acceleration of the vehicle based on the accelerator opening acquired by the accelerator opening detecting module 50a. Specifically, the target acceleration setting module 50b sets the target acceleration corresponding to the accelerator opening acquired by the accelerator opening detecting module 50a, by referring to a map in which the target acceleration to be set in relation to the accelerator opening is defined before use (hereinafter, referred to as the "acceleration characteristic map"). This acceleration characteristic map is defined for every predetermined vehicle speed and gear position.

The engine control module 50c adjusts the engine torque to achieve the target acceleration set by the target acceleration setting module 50b. Specifically, the engine control module 50c sets a target torque required for shifting an actual acceleration to the target acceleration, and controls the throttle valve 5 and/or the intake valve 12 through the variable intake valve mechanism 18, and additionally controls the fuel injector 13, etc., so as to cause the engine 10 to output the target torque.

Further, the engine control module 50c limits a variation of the target torque which is set according to the target acceleration set by the target acceleration setting module 50b, so that a jerk produced in the vehicle when the accelerator opening reduces (i.e., during deceleration) does not exceed a predetermined value. In this case, the engine control module 50c may function as a "limiter."

Thus, the ECU 50 may be referred to as the "control device for the engine."

<Acceleration Characteristic>

Next, the acceleration characteristic which defines the target acceleration to be set in relation to the accelerator opening, which is applied in this embodiment, is described. In this embodiment, the acceleration characteristic in which the relationship between the accelerator opening and the target acceleration is defined is designed so that a desired jerk is produced in the vehicle when the driver depresses the accelerator pedal 29. First, the jerk to be produced when the driver depresses the accelerator pedal 29 in this embodiment is described with reference to FIGS. 4A to 4C.

Figure 4A:
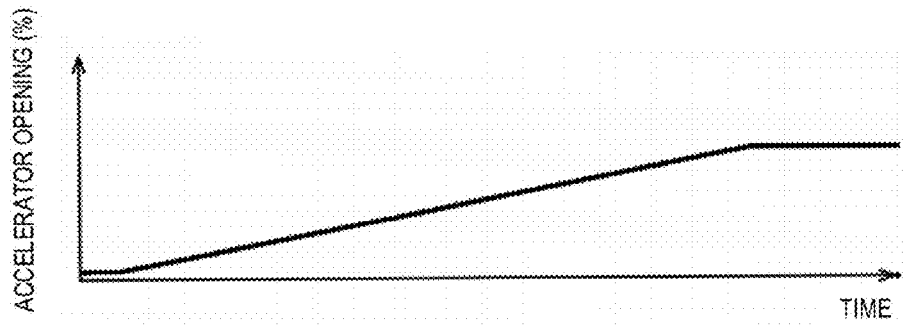
FIGS. 4A to 4C are diagrams illustrating a jerk to be produced when a driver depresses an accelerator pedal, according to the embodiment of the present invention.
Figure 4B:
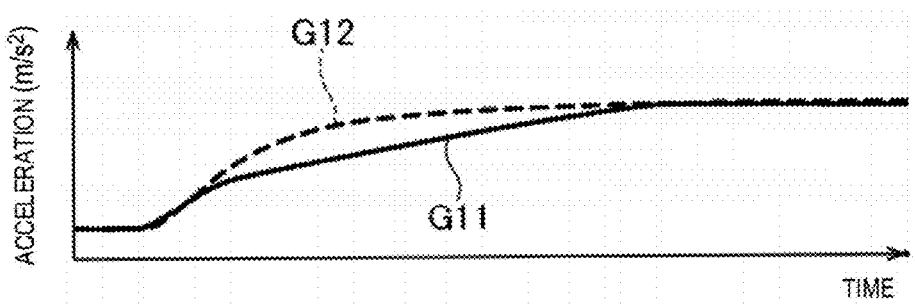
Figure 4C:
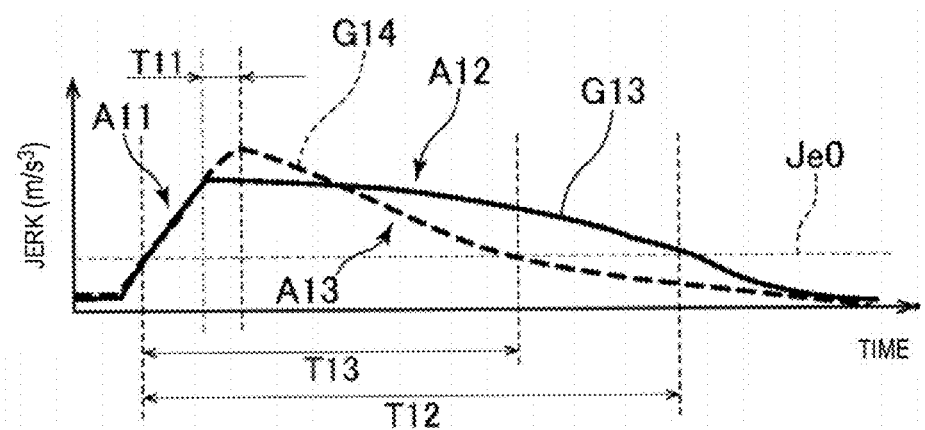

FIGS. 4A to 4C are diagrams illustrating the jerk to be produced in the vehicle during acceleration in this embodiment. Here, a jerk of a comparative example is given for comparison with the jerk of this embodiment. As illustrated in FIG. 4A, in this embodiment, when the driver depresses the accelerator pedal 29 at a fixed operational speed, the acceleration indicated by the chart G11 of FIG. 4B occurs, and the jerk indicated by the chart G13 of FIG. 4C is produced as well, whereas, in the comparative example, the acceleration indicated by the chart G12 of FIG. 4B occurs, and the jerk indicated by the chart G14 of FIG. 4C is produced as well. FIG. 4C further illustrates, with a reference character "Je0," a lowest value of jerk which the driver can generally feel (e.g., 1 m/s$^3$). Hereinafter, this lowest jerk is simply referred to as the "lowest perceivable jerk."

Note that here, a situation where the accelerator pedal 29 is depressed from a state where the target acceleration is set to zero, for example, a situation where the vehicle is accelerated after making a turn out from a state where the target acceleration is set to zero for the turn out, is considered. The state where the target acceleration is set to zero corresponds to a state where traveling resistance applied to the vehicle (including air resistance, road surface resistance and resistance due to a road gradient) and the drive force supplied to the wheels are in balance.

As indicated in a portion of the arrow A11 of FIG. 4C, in this embodiment and the comparative example, the jerk is increased at a similar change rate corresponding to the depression of the accelerator pedal 29. However in this embodiment, the highest value of the jerk produced in the vehicle is set lower than the comparative example. In this manner, a period of time required for the jerk to reach the highest value is shortened in this embodiment compared to the comparative example (see the reference character T11). For example, in this embodiment, the jerk reaches the highest value in about 200 ms from the start of depression of the accelerator pedal 29. Thus, in this embodiment, by shortening the time period required for the jerk to reach the highest value, a quick acceleration feel, in other words, an impression that the vehicle has a quick response, can be provided to the driver. In addition, in this embodiment, the driver is left an impression of a point (timing) at which the jerk reaches the highest value, so that the driver can quickly predict a level of acceleration of the vehicle based on this point.

Further, as indicated in portions of the arrows A12 and A13 of FIG. 4C, in this embodiment, the jerk is gently reduced after reaching the highest value, compared to the comparative example. More specifically, in this embodiment, the jerk is kept substantially at a fixed value and then gently reduced. Thus, in this embodiment, a period in which the jerk is above the lowest perceivable jerk Je0 described above is longer than the comparative example (see the reference characters T12 and T13). In this embodiment, the highest value of the jerk to be produced in the vehicle is reduced compared to the comparative example as described above so as to secure allowance of the engine output. Therefore, the period in which the jerk is above the lowest perceivable jerk Je0 can be extended. Thus, in this embodiment, a time range where the driver can feel the change of acceleration is extended by elongating the period in which the jerk is above the lowest perceivable jerk Je0, and a linear acceleration feel is secured (also see the chart G11 of FIG. 4B) by keeping the jerk substantially fixed over time.

As described above, in this embodiment, the acceleration characteristic in which the relationship between the accelerator opening and the target acceleration is defined is designed so that the jerk indicated by the chart G13 of FIG. 4C described above is produced in the vehicle when the accelerator pedal 29 is depressed (i.e., during acceleration). Specifically, the acceleration characteristic map which is used by the target acceleration setting module 50b of the ECU 50 described above is defined so that a mode of a characteristic indicating a relationship between the accelerator opening and the jerk (hereinafter, referred to as the "jerk characteristic") becomes similar to that in which the temporal change of the jerk indicated by the chart G13 is expressed in relation to the accelerator opening. The mode of the characteristic indicating the relationship between the accelerator opening and the jerk can be obtained by differentiating, with respect to time, the target acceleration defined in the acceleration characteristic.

Figure 5A:
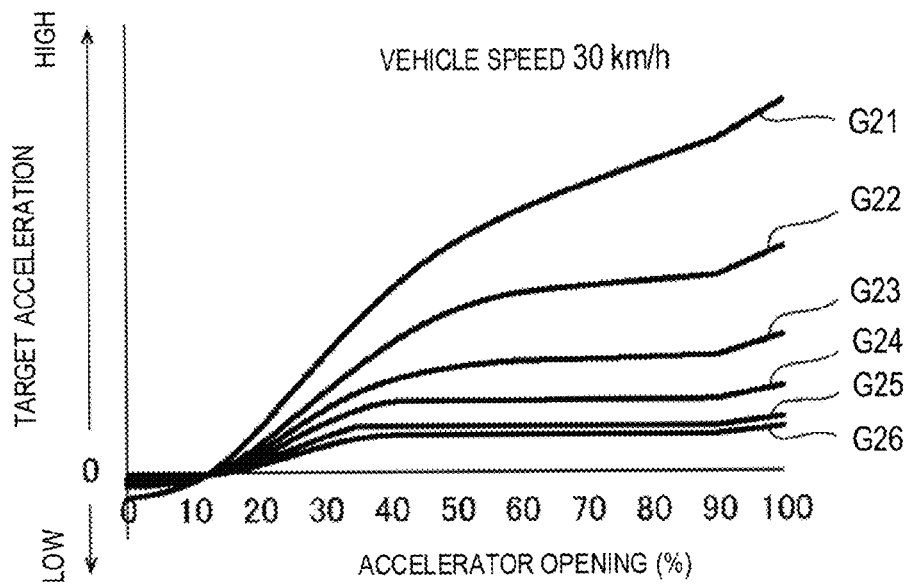
FIGS. 5A to 5C are charts illustrating one example of acceleration characteristic maps for predetermined vehicle speeds and gear positions, respectively, according to the embodiment of the present invention.
Figure 5B:
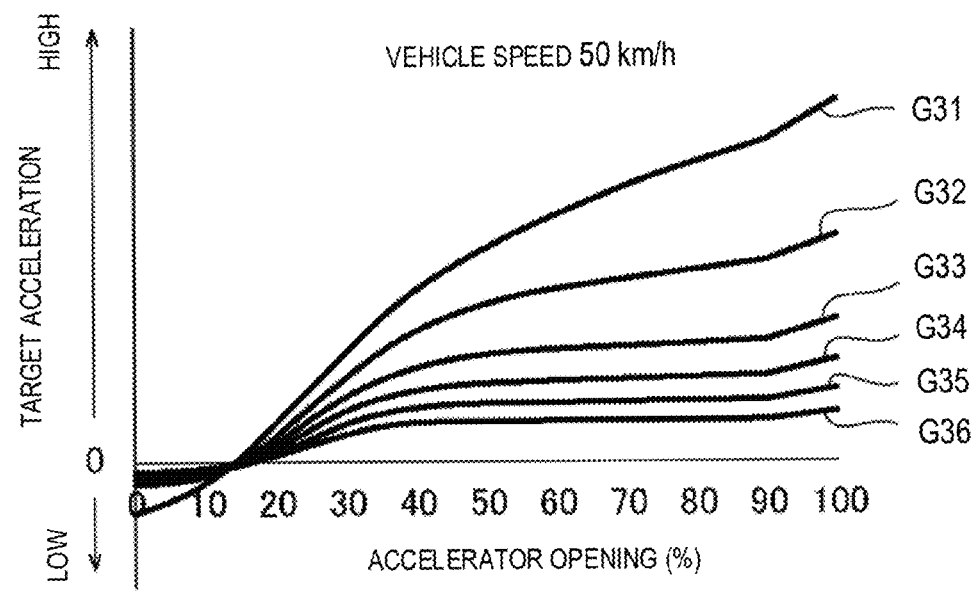
Figure 5C:
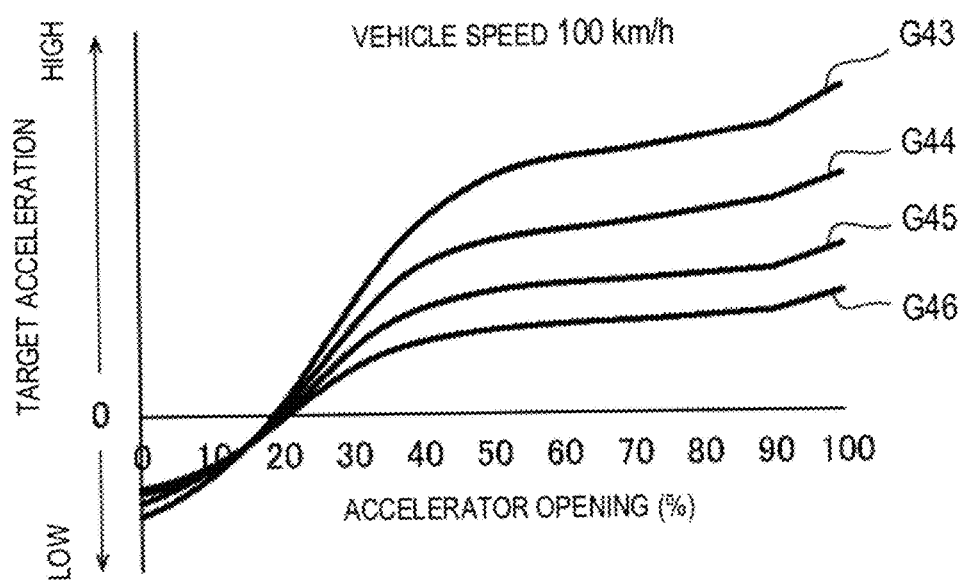

The acceleration characteristic map of this embodiment is described in detail with reference to FIGS. 5A to 5C. FIGS. 5A to 5C are charts illustrating one example of the acceleration characteristic maps for predetermined vehicle speeds and gear positions, respectively, according to this embodiment. In each of FIGS. 5A to 5C, the horizontal axis indicates the accelerator opening and the vertical axis indicates the target acceleration.

FIG. 5A illustrates acceleration characteristic maps applied at a vehicle speed of 30 km/h, FIG. 5B illustrates acceleration characteristic maps applied at a vehicle speed of 50 km/h, and FIG. 5C illustrates acceleration characteristic maps applied at a vehicle speed of 100 km/h. Further, the charts G21 to G26 of FIG. 5A indicate acceleration characteristic maps applied for the gear positions of the first to sixth ranges, respectively. The charts G31 to G36 of FIG. 5B indicate acceleration characteristic maps applied for the gear positions of the first to sixth ranges, respectively. The charts G43 to G46 of FIG. 5C indicate acceleration characteristic maps applied for the gear positions of the third to sixth ranges, respectively. As illustrated in FIGS. 5A to 5C, in each acceleration characteristic map, the target acceleration is set to zero when the accelerator opening is about 20 percent.

Note that, although the acceleration characteristic maps applied at 30 km/h, 50 km/h, and 100 km/h are illustrated in FIGS. 5A to 5C as an example, practically, acceleration characteristic maps for various other vehicle speeds are also prepared. Further, in FIG. 5C, since the vehicle speed is comparatively high at 100 km/h and maps for low gear positions (first and second ranges) are usually not used at this vehicle speed, the illustration of these maps is omitted.

Figure 6A:
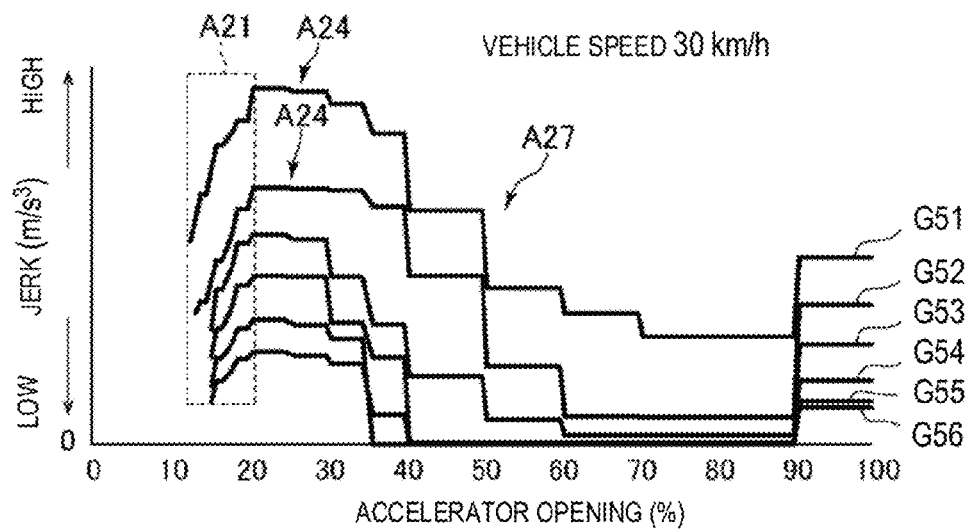
FIGS. 6A to 6C are charts illustrating one example of jerk characteristics obtained by differentiating, with respect to time, target accelerations defined in the respective acceleration characteristic maps, according to the embodiment of the present invention.
Figure 6B:
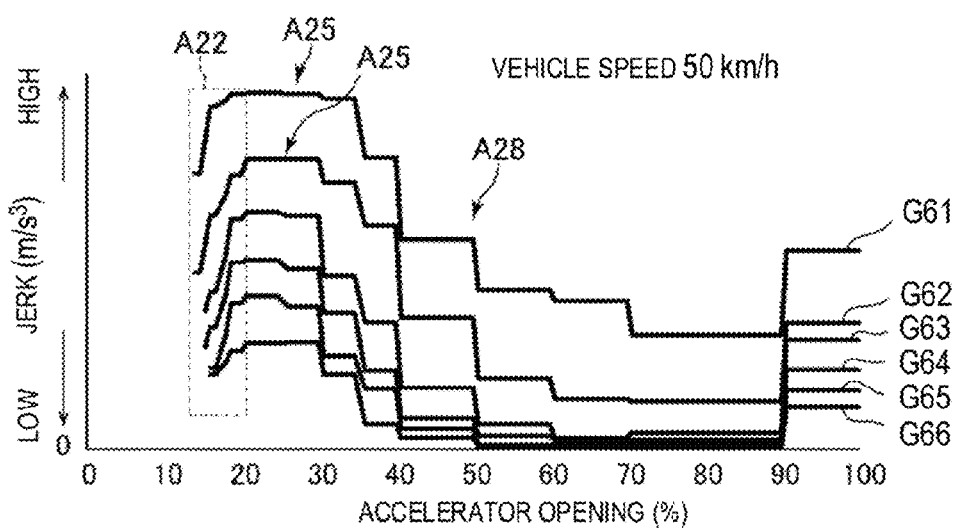
Figure 6C:
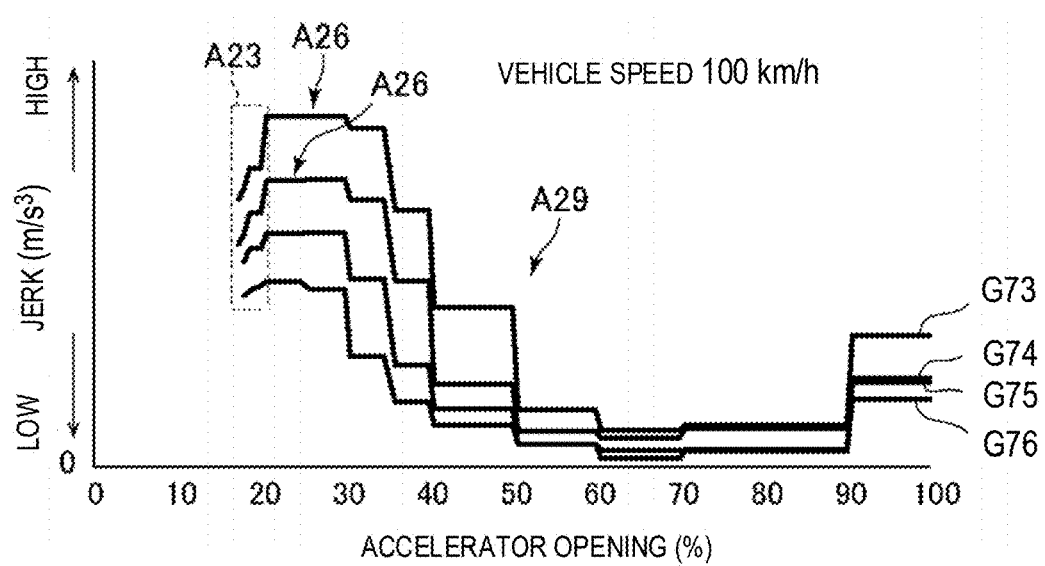

FIGS. 6A to 6C are charts illustrating one example of the jerk characteristics obtained by differentiating, with respect to time, the target accelerations defined in the respective acceleration characteristic maps, according to this embodiment. In each of FIGS. 6A to 6C, the horizontal axis indicates the accelerator opening and the vertical axis indicates the jerk.

FIG. 6A illustrates a jerk characteristic at the vehicle speed of 30 km/h, which is obtained by differentiating, with respect to time, the target acceleration defined in the acceleration characteristic map of FIG. 5A. FIG. 6B illustrates a jerk characteristic at the vehicle speed of 50 km/h, which is obtained by differentiating, with respect to time, the target acceleration defined in the acceleration characteristic map of FIG. 5B. FIG. 6C illustrates a jerk characteristic at the vehicle speed of 100 km/h, which is obtained by differentiating, with respect to time, the target acceleration defined in the acceleration characteristic map of FIG. 5C. Further, the charts G51 to G56 of FIG. 6A indicate jerk characteristics for the gear positions of the first to sixth ranges, respectively. The charts G61 to G66 of FIG. 6B indicate jerk characteristics for the gear positions of the first to sixth ranges, respectively. The charts G73 to G76 of FIG. 6C indicate jerk characteristics for the gear positions of the third to sixth ranges, respectively.

Note that although the jerk characteristics at 30 km/h, 50 km/h, and 100 km/h are illustrated in FIGS. 6A to 6C as an example, practically, jerk characteristics for various other vehicle speeds are also defined. Further, each of FIGS. 6A to 6C illustrates a change of the jerk within an accelerator opening range exceeding the opening at which the target acceleration is set to zero. In other words, in each of the charts G51 to G56, G61 to G66, and G73 to 76, the lowest value of the accelerator opening corresponds to the opening at which the target acceleration is set to zero. In addition, in FIG. 6C, since the vehicle speed is comparatively high at 100 km/h and jerk characteristics for low gear positions (first and second ranges) are usually not applied at this vehicle speed, the illustration of these characteristics is omitted.

As indicated in portions of the reference characters A21 to A23 in FIGS. 6A to 6C, in this embodiment, the jerk characteristic is defined in relation to the accelerator opening so that the highest jerk is produced in the vehicle when the accelerator opening is 5 to 10 percent larger than that at which the target acceleration is set to zero. Specifically, the acceleration characteristic map indicating the relationship between the accelerator opening and the target acceleration is designed so that when the accelerator opening is increased from the state where the target acceleration is set to zero, the highest jerk is produced in the vehicle when the accelerator opening is 5 to 10 percent larger than that at which the target acceleration is set to zero (e.g., between 18 and 21 percent). Thus, the jerk characteristic described above is achieved.

Further, as indicated in portions of the arrows A24 to 26 in FIGS. 6A to 6C, in this embodiment, the jerk characteristic in relation to the accelerator opening is defined so that the jerk is substantially fixed regardless of an increase of the accelerator opening within a predetermined range of the accelerator opening. The predetermined range is above the opening at which the highest jerk is produced in the vehicle. Actually, the acceleration characteristic map indicating the relationship between the accelerator opening and the target acceleration is designed so that the jerk is substantially fixed regardless of the increase of the accelerator opening within the predetermined range of the accelerator opening which exceeds the opening at which the highest jerk is produced in the vehicle. Thus, the jerk characteristic described above is achieved.

Note that the predetermined range of the accelerator opening within which the jerk is substantially fixed regardless of the increase of the accelerator opening varies depending on the value of the highest jerk to be produced in the vehicle. Specifically, the applied predetermined range of the accelerator opening becomes narrower as the highest jerk becomes higher.

Further, as indicated in portions of the arrows A27 to A29 in FIGS. 6A to 6C, in this embodiment, the jerk characteristic in relation to the accelerator opening is defined so that the jerk reduces as the accelerator opening increases above the predetermined range described above. More specifically, the jerk characteristic in relation to the accelerator opening is defined so that a change rate (absolute value) of the jerk when it reduces becomes gradually higher as the accelerator opening increases. Actually, the acceleration characteristic map indicating the relationship between the accelerator opening and the target acceleration is defined so that the jerk reduces as the accelerator opening increases above the predetermined range and the change rate of the reducing jerk becomes gradually higher as the accelerator opening increases. Thus, the jerk characteristic described above is achieved. For example, the jerk is reduced as the accelerator opening increases, based on a quadratic function defined based on the accelerator opening and the jerk.

Next, a specific method of determining the characteristic of the jerk to be produced in the vehicle according to the accelerator opening (jerk characteristic) in this embodiment is described with reference to FIGS. 7 to 9. Note that based on the determined jerk characteristic, the acceleration characteristic map for achieving this jerk characteristic is defined before use (see FIGS. 5A to 5C), and a target acceleration corresponding to an actual accelerator opening, the vehicle speed, and the gear position is set by referring to the acceleration characteristic map, and the engine torque is adjusted to achieve the target acceleration.

Figure 7B:
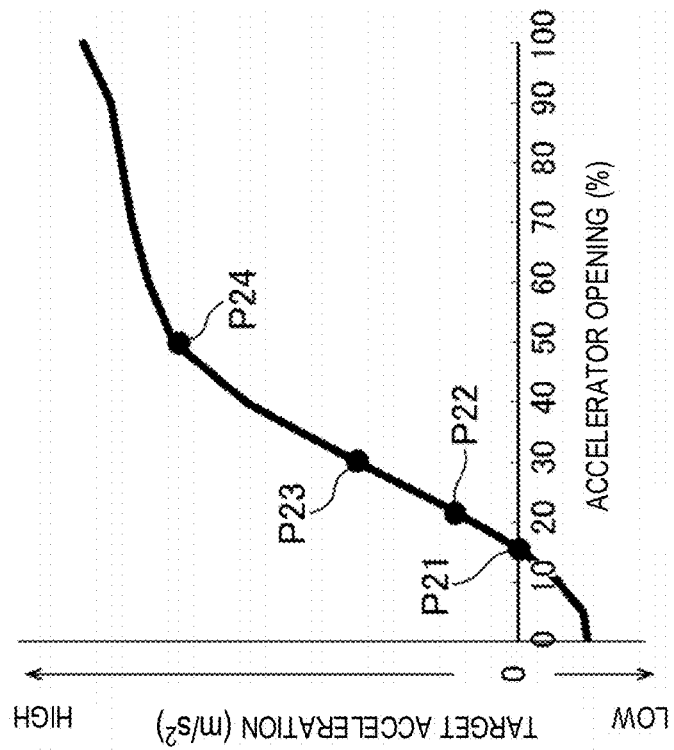
FIGS. 7A and 7B are diagrams illustrating a method of determining values of predetermined points which define a mode of a jerk characteristic according to the embodiment of the present invention.
Figure 7A:
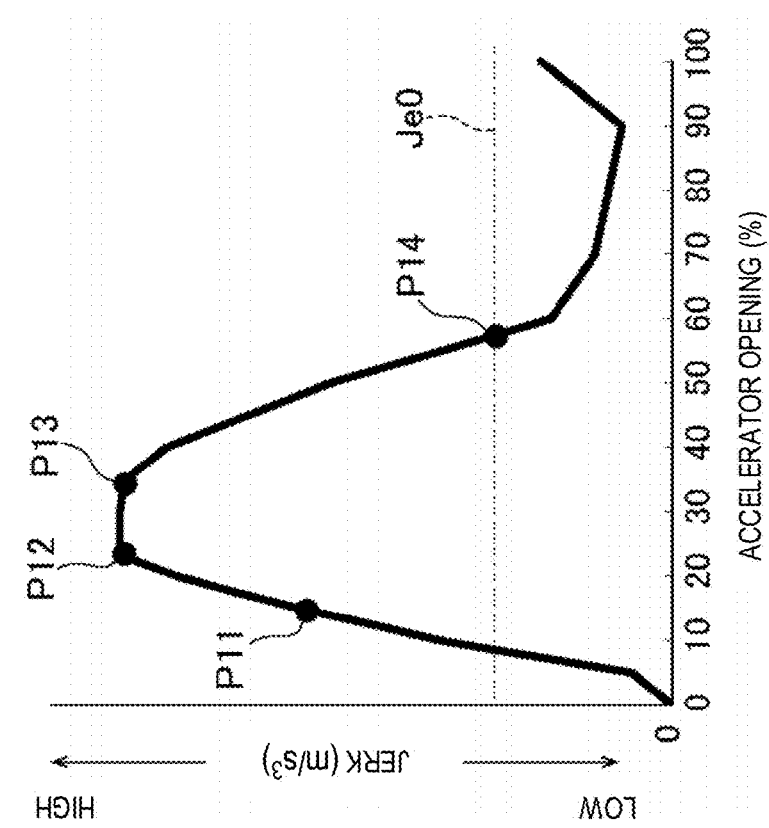

FIGS. 7A and 7B are diagrams illustrating a method of determining values of predetermined points (values of the accelerator opening and jerk) which define a mode of the jerk characteristic according to this embodiment. FIG. 7A illustrates the accelerator opening and the jerk in the horizontal axis and the vertical axis, respectively, and illustrates one example of the jerk characteristic of this embodiment. On the other hand, FIG. 7B illustrates the accelerator opening and the target acceleration in the horizontal axis and the vertical axis, respectively, and illustrates one example of the acceleration characteristic of this embodiment.

As illustrated in FIG. 7A, the mode of the jerk characteristic is defined by values at points P11 to P14. The point P11 is a point corresponding to the accelerator opening at which the target acceleration becomes zero, the point P12 is a point where the highest jerk is produced, the point P13 is a point at which the jerk will no longer be kept substantially at the highest jerk, in other words, the jerk kept substantially at the highest jerk starts being reduced, and the point P14 is a point at which the reducing jerk reaches the lowest perceivable jerk Je0. Hereinafter, the accelerator opening and jerk corresponding to the point P11 are denoted with "Ac1" and "Je1," respectively, the accelerator opening and jerk corresponding to the point P12 are denoted with "Ac2" and "Je2," respectively, the accelerator opening and jerk corresponding to the point P13 are denoted with "Ac3" and "Je3," respectively, and the accelerator opening and jerk corresponding to the point P14 are denoted with "Ac4" and "Je4," respectively. Further, in the acceleration characteristic illustrated in FIG. 7B, the points P21 to P24 correspond to the points P11 to P14 of the jerk characteristic illustrated in FIG. 7A, respectively.

Hereinafter, a method of determining the accelerator openings Ac1 to Ac4 and the jerks Je1 to Je4 at the respective points P11 to P14 is described in detail.

First, an acceleration when the accelerator opening is fully opened (hereinafter, referred to as the "highest acceleration") is obtained according to the operating state of the engine 10 (e.g., an engine speed and a set gear position) at the point P11 at which the target acceleration is set to zero, and the jerk Je2 at the point P12 (highest jerk) is determined based on the highest acceleration. Basically, the highest jerk Je2 of a larger value is determined as the highest acceleration is higher.

Note that the highest jerk Je2 is preferably a value with which an engine output required to keep the jerk above the lowest perceivable jerk Je0 for a certain period of time after reaching the highest jerk Je2, can be secured at the timing that the jerk reaches the highest jerk Je2. In other words, the highest jerk Je2 is preferably determined so that an engine output required to keep the jerk with which the linear acceleration feel can be obtained after the jerk reaches the highest jerk Je2 is secured at the timing that the jerk reaches the highest jerk Je2.

Next, a timing of producing the highest jerk Je2 (specifically, a period of time from the start of depression of the accelerator pedal 29 in the state where the target acceleration is set to zero, until the highest jerk Je2 is produced) is determined based on the highest jerk Je2 determined as above and the vehicle speed. Basically, the time period is determined to be shorter (i.e., the timing of producing the highest jerk Je2 is determined to be earlier) as the highest jerk Je2 is lower and the vehicle speed is higher. For example, the timing of producing the highest jerk Je2 is determined to be within a time range between 170 and 300 ms. Next, the jerk Je1 at the point P11 is determined based on the highest jerk Je2 and the timing of producing the highest jerk Je2. Basically, the jerk Je1 of a smaller value is determined as the timing of producing the highest jerk Je2 is later. For example, a ratio of the jerk Je1 with respect to the highest jerk Je2 (e.g., between 70 and 90 percent) is determined and the jerk Je1 is obtained based on the ratio.

On the other hand, as for the accelerator opening Ac1 at the point P11 (i.e., the accelerator opening Ac1 at which the target acceleration is set to zero), for example, an accelerator opening corresponding to an angle of an ankle of the driver which minimizes a load applied to the leg muscles of the driver when operating the accelerator is applied. Further, the accelerator opening Ac2 at the point P12 (i.e., the accelerator opening Ac2 at which the highest jerk Je2 is produced) is determined based on the accelerator opening Ac1 at the point P11 and the timing of producing the highest jerk Je2 described above. Specifically, the accelerator opening Ac2 at the point P12 is obtained by adding, to the accelerator opening Ac1 at the point P11, a value obtained by converting the timing of producing the highest jerk Je2 into the accelerator opening.

Next, the time period for which the highest jerk Je2 is maintained is determined based on the highest jerk Je2 and the highest acceleration. Basically, the time period for which the highest jerk Je2 is maintained is determined to be shorter as the highest jerk Je2 is higher and the highest acceleration is lower. For example, the time period for which the highest jerk Je2 is maintained is determined to be within a time range between 100 and 350 ms.

Note that the reason why the time period for which the highest jerk Je2 is maintained is determined to be shorter as the highest jerk Je2 is higher is as follows. If the time period for which the highest jerk Je2 is maintained is determined to be longer when the highest jerk Je2 is high, the acceleration at the timing that the maintaining of the highest jerk Je2 ends tends to reach close to a target acceleration to be set finally. Therefore, after the maintaining of the highest jerk Je2 ends, the jerk Je2 cannot be reduced gently, but needs to be reduced sharply (in this case, the period in which the jerk is above the lowest perceivable jerk Je0 becomes short), and the linear acceleration feel cannot suitably be secured. For this reason, in this embodiment, the time period for which the highest jerk Je2 is maintained is determined to be shorter as the highest jerk Je2 is higher.

The accelerator opening Ac3 at the point P13 (i.e., the accelerator opening Ac3 at the point P13 at which the jerk will no longer be kept substantially at the highest jerk Je2) is determined based on the time period for which the highest jerk Je2 is maintained, which is determined as above. Specifically, the accelerator opening Ac3 at the point P13 is obtained by adding to the accelerator opening Ac2 at the point P12, a value obtained by converting the time period for which the highest jerk Je2 is maintained into the accelerator opening. Note that the highest jerk Je2 at the point P12 is applied as-is to be the jerk Je3 at the point P13.

Next, a method of determining the accelerator opening Ac4 and the jerk Je4 at the point P14 in this embodiment is described with reference to FIG. 8. In FIG. 8, the horizontal axis indicates the accelerator opening and the vertical axis indicates the jerk.

Figure 8:
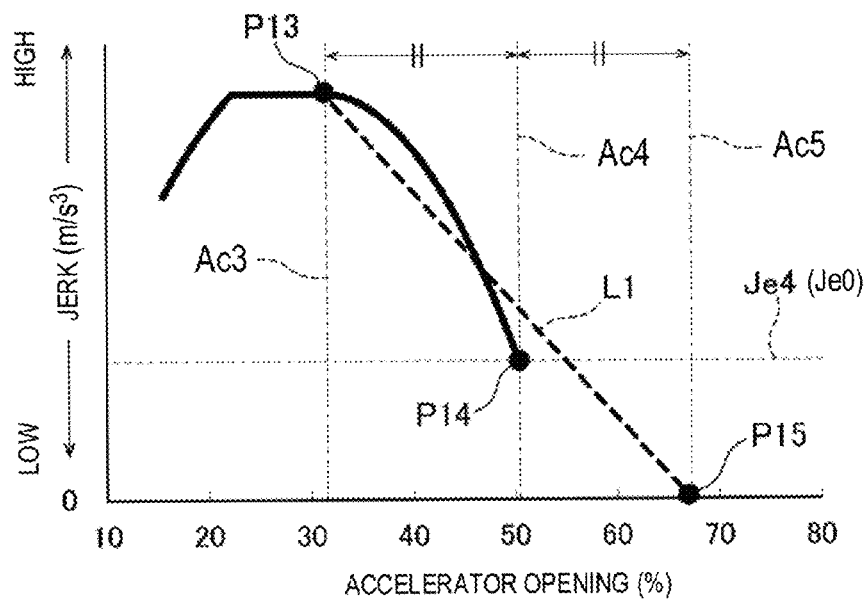
FIG. 8 is a diagram illustrating a method of determining an accelerator opening and a jerk at a point P14 of FIG. 7A, according to the embodiment of the present invention.

As illustrated in FIG. 8, a point P15 defined based on the accelerator opening at which the jerk becomes zero is first determined (hereinafter, the accelerator opening at the point P15 is denoted with "Ac5"). The accelerator opening Ac5 at the point P15 corresponds to an accelerator opening at which the depression of the accelerator pedal 29 for acceleration from the state where the target acceleration is zero ends, in other words, an accelerator opening for achieving the target acceleration to be set in the end. Such an accelerator opening Ac5 can be determined based on the highest acceleration described above, and basically, the accelerator opening Ac5 of a larger value is determined as the highest acceleration is higher. For example, the accelerator opening Ac5 is determined within a range between 30 and 80 percent. When the jerk is linearly reduced from the point P13 described above to the point P15 so as to reach zero at the point P15 which corresponds to the accelerator opening Ac5, this reduction can be expressed as the segment L1 in FIG. 8.

In this embodiment, an accelerator opening corresponding to a median of the accelerator opening Ac5 at the point P15 and the accelerator opening Ac3 at the point P13 is determined as the accelerator opening Ac4 at the point P14 (Ac4=(Ac3+Ac5)/2). Further, as described above, the lowest perceivable jerk Je0 is applied to be the jerk Je4 at the point P14. In this case, since the lowest perceivable jerk Je0, which is the lowest value of jerk which the driver can generally feel, varies according to the highest acceleration, the jerk Je4 at the point P14 is determined based on the highest acceleration. Specifically, since the lowest perceivable jerk Je0 becomes higher as the highest acceleration is higher (i.e., it becomes more difficult for the driver to feel a low jerk as the highest acceleration is higher), the jerk Je4 of a larger value is determined as the highest acceleration is higher. For example, the jerk Je4 is determined within a range between 0.5 and 3 m/s$^3$.

Note that the accelerator opening Ac4 at the point P14 is not limited to being the median of the accelerator opening Ac5 at the point P15 and the accelerator opening Ac3 at the point P13, and it may be a value obtained by correcting the median. Specifically, when a difference between the acceleration at the point P13 and the final target acceleration is large, since the jerk can be reduced more gently, the accelerator opening Ac4 at the point P14 may be corrected to a larger value than the median.

Next, a method of determining a curve connecting the point P11 to the point P12 and a curve connecting the point P13 to the point P14 is described with reference to FIG. 9. In FIG. 9, the horizontal axis indicates time and the vertical axis indicates the jerk. The time in the horizontal axis is obtained by converting the accelerator opening into time. Here, a method of determining a curve constituting a mode of a jerk characteristic expressed with the time instead of the accelerator opening is described.

Figure 9:
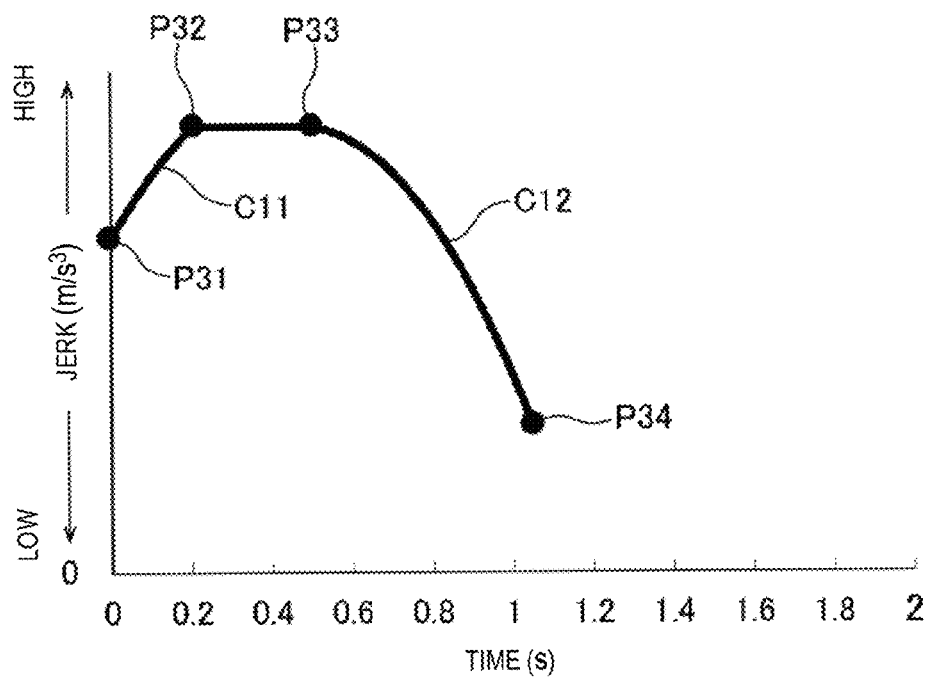
FIG. 9 is a diagram illustrating a method of determining a curve connecting a point P11 to a point P12 of FIG. 7A and a curve connecting a point P13 to the point P14 of FIG. 7A, according to the embodiment of the present invention.

Points P31 to P34 illustrated in FIG. 9 correspond to the above-described points P11 to P14 of which the accelerator opening is converted into time, respectively. Hereinafter, the time corresponding to the point P31 is denoted with "t1," the time corresponding to the point P32 is denoted with "t2," the time corresponding to the point P33 is denoted with "t3," and the time corresponding to the point P34 is denoted with "t4." The jerks corresponding to the points P31 to P34 are the above-described jerks Je1 to Je4, respectively.

First, a quadratic curve expressed by the following Equation 1 is applied for the curve C11 connecting the point P31 to the point P32.

$$Je = k_1 \times t^2 + k_2 \times t + k_3 \quad (1)$$

In Equation 1, "Je" indicates a jerk and "t" indicates time (both variables, which apply for below as well). Further, "$k_1$," "$k_2$," "$k_3$" indicate predetermined coefficients. A value based on the highest acceleration and the highest jerk is applied to the coefficient $k_1$. Specifically, the coefficient $k_1$ of a smaller value is applied as the highest acceleration is higher and the highest jerk is higher. For example, a value within a range between −5 and 0 is determined as the coefficient $k_1$. A value obtained by the following Equation 2 is applied to the coefficient $k_2$. The jerk Je1 at the point P31 is applied to the coefficient $k_3$.

$$k_2=(-k_1 \times t1^2 + k_1 \times t2^2 + Je1 - Je2)/(t1-t2) \quad (2)$$

Next, a quadratic curve (a parabola) expressed by the following Equation 3 is applied to a curve C12 connecting the point P33 to the point P34.

$$Je = k_4/(2 \times k_5^2) \times (t-t3) \times (t-t3) \quad (3)$$

In Equation 3, "$k_4$" and "$k_5$" indicate predetermined coefficients. Equation 3 is a simulation of an equation expressing a temporal change of a position of an object in a horizontally launched projectile motion. Therefore, a value "g" indicating a gravitational acceleration (9.80665) is applied to the coefficient $k_4$ as-is. Further, a value corresponding to an initial velocity used in the equation of the horizontally launched projectile motion is applied to the coefficient $k_5$. Specifically, a value obtained based on the following Equation 4 is applied to the coefficient $k_5$.

$$k_5 = \{g \times (t4-t3)^2/2(Je3-Je4)\}^{1/2} \quad (4)$$

In this embodiment, the jerk characteristic expressed with time, which is determined as above, is converted into a jerk characteristic expressed with the accelerator opening. In one example, when the accelerator operation is performed at an operational speed of 33.3%/s, the time may be converted into the accelerator opening by using an equation "t×33.3+Ac1." Further in this embodiment, when the jerk characteristic expressed with the accelerator opening is obtained by converting the time into the accelerator opening as above, the acceleration characteristic map in which the relationship between the accelerator opening and the target acceleration is defined is designed for every predetermined vehicle speed and gear position so as to achieve the obtained jerk characteristic (see FIGS. 5A to 5C).

By using one of the accelerator characteristic maps as above, when the accelerator pedal 29 is depressed (i.e., during acceleration), the target acceleration is set according to the accelerator opening and the engine torque is adjusted. Thus, the jerk indicated in the chart G13 of FIG. 4C is produced in the vehicle. Note that the mode of the temporal change of the jerk indicated in the chart G13 of FIG. 4C is, to be exact, different from the modes of the jerk characteristic obtained by converting the target acceleration in the acceleration characteristic map into the jerk, which are illustrated in FIGS. 6A to 6C. This difference occurs since the vehicle speed increases while the accelerator pedal 29 is depressed and the applied acceleration characteristic map thus sequentially changes corresponding to the increasing vehicle speed.

<Deceleration Control>

Next, a control performed during deceleration (deceleration control) by using the acceleration characteristic maps described above in this embodiment is described. Basically, the engine torque is adjusted to achieve the target acceleration corresponding to the accelerator opening by referring to the acceleration characteristic maps (see FIGS. 5A to 5C) during the deceleration (i.e., when the accelerator opening reduces) as well. Particularly in this embodiment, the deceleration control is performed such that a characteristic of a change of a jerk produced in the vehicle due to a reduction of the accelerator opening correlates to a characteristic of a change of a jerk produced in the vehicle due to an increase of the accelerator opening. Note that the "increase of the accelerator opening" here is performed in an early half of a process from acceleration of the vehicle to constant speed travel of the vehicle, and the "reduction of the accelerator opening" here is performed in a latter half of the process.

Figure 10:
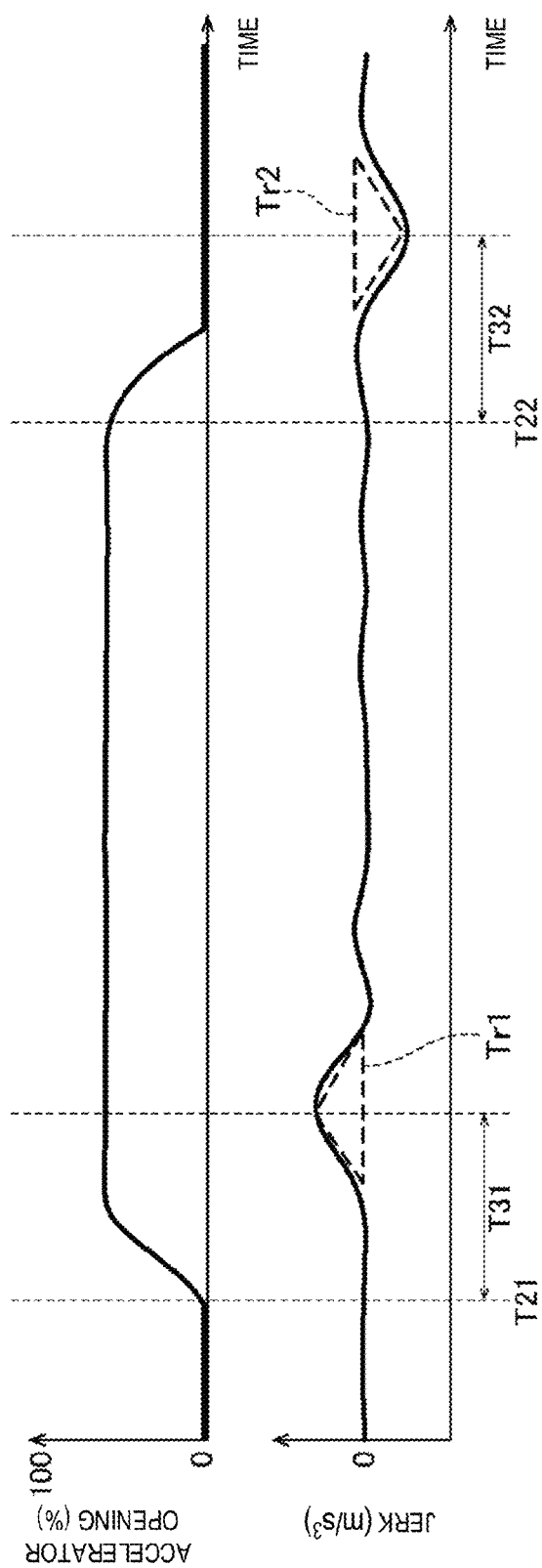
FIG. 10 shows time charts illustrating one example of the jerk produced in the vehicle, according to the embodiment of the present invention.

The jerk to be produced in the vehicle during the deceleration in this embodiment is described with reference to FIG. 10. FIG. 10 shows time charts illustrating one example of the jerk produced in the vehicle, according to this embodiment. Specifically, in FIG. 10, a temporal change of the accelerator opening is indicated in the upper chart, and a temporal change of the jerk is indicated in the lower chart. As illustrated in FIG. 10, the accelerator pedal 29 is depressed at a time point T21, then the accelerator opening is substantially fixed, and the accelerator pedal 29 is released at a time point T22. In this case, the accelerator pedal 29 is released substantially at the same operational speed as that for depressing the accelerator pedal 29.

As illustrated in FIG. 10, in this embodiment, a change mode of the jerk when the accelerator opening reduces (see the triangle Tr2 indicated by the dashed line) and a change mode of the jerk when the accelerator opening increases (see the triangle Tr1 indicated by the dashed line) are similar, specifically, they have a vertically inverted form with respect to each other (corresponding to a negative correlation). Additionally, a time length T32 from the start of releasing the accelerator pedal 29 until the jerk reaches a peak (negative peak), is substantially the same as a time length T31 from the start of depressing the accelerator pedal 29 until the jerk reaches a peak (positive peak). In this manner, an acceleration feel and a deceleration feel, which are provided to the driver, are made to match each other and a unity between the driver and the vehicle is improved.

Figure 11:
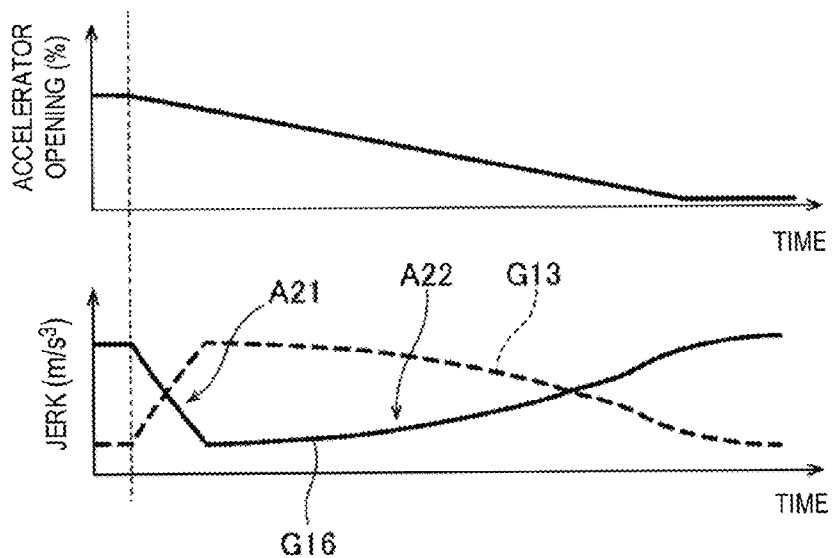
FIG. 11 shows diagrams illustrating a jerk to be produced when the driver releases the accelerator pedal, according to the embodiment of the present invention.

Next, a mode of the jerk to be produced during the deceleration in this embodiment is described more in detail with reference to FIG. 11. In FIG. 11, a temporal change of the accelerator opening is indicated in the upper chart, and a temporal change of the jerk is indicated in the lower chart. As illustrated in FIG. 11, a case where the driver releases the accelerator pedal 29 at a constant operational speed, specifically, at an operational speed substantially the same as that for depressing the accelerator pedal 29 as illustrated in FIG. 4A, is considered. Further in FIG. 11, the temporal change of the jerk when the accelerator pedal 29 is released is indicated by the chart G16, and also, for a comparison reason, the temporal change of the jerk when the accelerator pedal 29 is depressed as illustrated in FIG. 4A is indicated by the dashed line chart G13 (same as the chart G13 in FIG. 4C).

As indicated by the charts G13 and G16, in this embodiment, when the accelerator pedal 29 is released (when the accelerator opening reduces), the jerk changes in a mode similar to, in other words, a mode in the vertically inverted form with respect to, the change mode of the jerk when the accelerator pedal 29 is depressed (when the accelerator opening increases). Specifically, in this embodiment, first the jerk swiftly reaches a lowest value as the accelerator opening reduces (see the arrow A21), and then the jerk gently increases as the accelerator opening reduces (see the arrow A22). More specifically, after the jerk reaches the lowest value, the jerk is substantially kept at a fixed value and then is gently reduced.

Here, in this embodiment, when the accelerator opening reduces (during deceleration), similar to when the accelerator opening increases (during acceleration), the control using the accelerator characteristic maps described above (see FIGS. 5A to 5C) is performed as well. However, if the accelerator characteristic maps are used for the control as they are during the deceleration, the following issues may arise.

When the driver depresses the accelerator pedal 29, the accelerator operation is intentional. In other words, an intention of the driver is reflected on the accelerator operation when depressing the accelerator pedal 29. On the other hand, when the driver releases the accelerator pedal 29, the accelerator operation is hardly intentional. In other words an intention of the driver is hardly reflected on the accelerator operation when releasing the accelerator pedal 29. In this case, the position of the accelerator pedal 29 is typically returned by an act of a spring applied to the accelerator pedal 29. Therefore, a change speed of the accelerator opening in releasing the accelerator pedal 29 tends to be higher than a change speed of the accelerator opening in depressing the accelerator pedal 29.

Therefore, when the accelerator pedal 29 is released, if the control is performed based on the target acceleration which is set by using the acceleration characteristic maps according to the accelerator opening, the deceleration may become sharp. Since the acceleration characteristic maps are designed based on the change speed of the accelerator opening which is expected in the depression of the accelerator pedal 29, and not based on the high change speed of the accelerator opening in the release of the accelerator pedal 29, a sharp deceleration may occur if such acceleration characteristic maps are used as they are. That is, a high jerk (negatively high jerk) may be produced. As a result, the characteristic of the change of the jerk caused based on the accelerator opening change in the case where the accelerator opening reduces becomes different from the characteristic of the change of the jerk caused based on the accelerator opening change in the case where the accelerator opening increases.

For such reasons, in this embodiment, the jerk produced in the vehicle is limited so that the jerk produced in the vehicle when the accelerator opening reduces (although the jerk indicates a negative value in this case, the value of the jerk is expressed as an absolute value) does not to exceed a predetermined value (positive value, same for below). Specifically, in this embodiment, the change of the engine torque based on the target acceleration set by using the acceleration characteristic maps is limited, in other words, a control of smoothing the change of the engine torque (hereinafter, referred to as the "deceleration smoothing control") is performed, so that the jerk produced in the vehicle when the accelerator opening reduces does not exceed the predetermined value.

The predetermined value applied for the jerk is determined mainly in view of suppressing the sharp deceleration, and additionally, it is also determined in view of correlating the characteristic of the change of the jerk when the accelerator opening reduces, to the characteristic of the change of the jerk when the accelerator opening increases. Specifically, in this embodiment, by performing the deceleration smoothing control so that the jerk produced in the vehicle when the accelerator opening reduces does not exceed the predetermined value, the characteristic of the change of the jerk when the accelerator opening reduces, which correlates to the characteristic of the change of the jerk when the accelerator opening increases, is achieved. For example, the predetermined value applied for the jerk may be a value obtained according to the engine speed and the set gear position. In this case, the predetermined value applied for the jerk is preferably lowered as the engine speed reduces and the gear position becomes higher.

Specifically, in this embodiment, the engine control module 50c of the ECU 50 described above performs the deceleration smoothing control. First, the engine control module 50c sets the limit value regarding the change of the engine torque (hereinafter, referred to as the "torque change limit value"), based on a current engine torque (actual engine torque) and a change of the engine torque within a predetermined period of time (specifically, a difference between a latest target torque and a target torque set previous to the latest target torque (previous target torque)). In this case, the engine control module 50c sets the torque change limit value by using a map with which the torque change limit value to be set based on the current engine torque and the change of the engine torque is associated before use (hereinafter, referred to as the "deceleration smoothing control map").

Further, in a case where a value of the change amount (basically a negative value) of the engine torque based on the target acceleration set by using the acceleration characteristic maps is below the torque change limit value described above (negative value), in other words, in a case where the target torque is changed beyond the limitation defined by the torque change limit value, the change of the target torque is limited by the torque change limit value, in other words, the engine control module 50c performs the deceleration smoothing control. In this case, the engine control module 50c determines, as the target torque used for the control of the engine 10, a torque obtained by applying the torque change limit value to the previous target torque, instead of the torque according to the target acceleration set by using the acceleration characteristic maps.

On the other hand, in a case where the value of the change amount (basically a negative value) of the engine torque based on the target acceleration set by using the acceleration characteristic maps is the torque change limit value described above (negative value) or above, in other words, in a case where the target torque is not changed beyond the limitation defined by the torque change limit value, the change of the target torque is not limited by the torque change limit value, in other words, the engine control module 50c does not perform the deceleration smoothing control. In this case, the engine control module 50c determines the torque corresponding to the target acceleration set by using the acceleration characteristic maps as-is to be the target torque used for the control of the engine 10.

When the driver releases the accelerator pedal 29 with a certain intention, as described above, the value of the change amount of the target torque according to the target acceleration set by using the acceleration characteristic maps tends to be above the torque change limit value. In other words, the target torque is not changed beyond the limitation defined by the torque change limit value. In this case, even if the deceleration smoothing control is not performed and the engine torque is directly controlled according to the target acceleration set by using the acceleration characteristic maps, the sharp deceleration does not occur and the characteristic of the change of the jerk when the accelerator opening reduces correlates to the characteristic of the change of the jerk when the accelerator opening increases.

Figure 12:
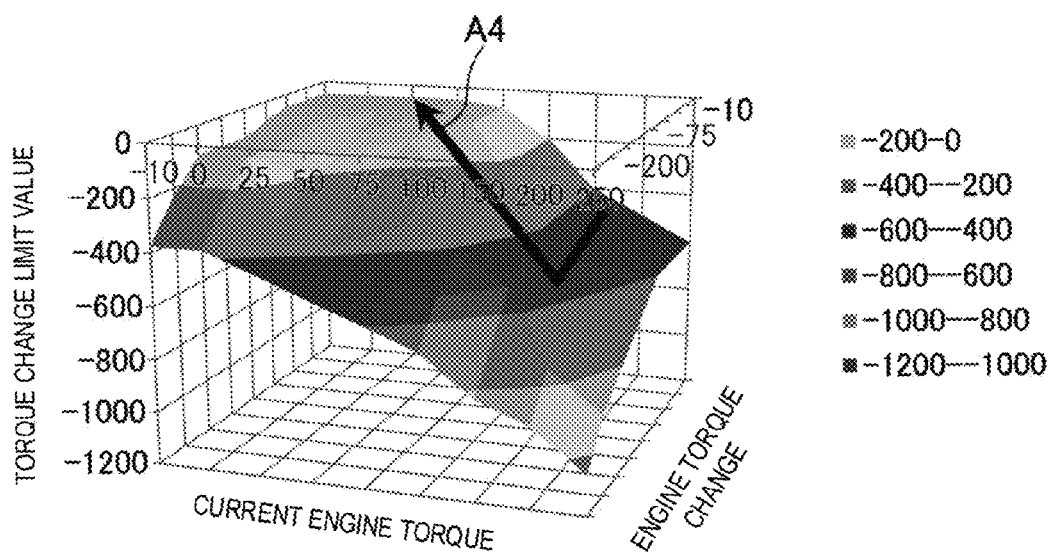
FIG. 12 is a view illustrating a deceleration smoothing control map according to the embodiment of the present invention.

FIG. 12 is a view illustrating one example of a deceleration smoothing control map of this embodiment. As illustrated in FIG. 12, in the deceleration smoothing control map, the torque change limit value to be set is associated with the current engine torque and the change of the engine torque within the predetermined time period (the difference between the latest target torque and the previous target torque, which corresponds to the operational speed of the accelerator pedal 29). According to the deceleration smoothing control map, the torque change limit value to be set (negative value) becomes negatively higher as the current engine torque (basically a positive value) becomes positively higher and the value of the change amount of the engine torque (basically a negative value) becomes negatively higher, which corresponds to loosening the limit on the change of the engine torque.

When the driver releases the accelerator pedal 29, for example, as indicated by the arrow A4 of FIG. 12, the torque change limit value to be set changes on faces of a polyhedron constituting the deceleration smoothing control map. As indicated by the arrow A4, a trail of the change of the torque change limit value curves. The trail is not straight because of a characteristic of the operation of the accelerator pedal 29 performed by an average driver (a characteristic in which the operational speed is low in a start of operation, becomes higher, and then in the end of the operation, the operational speed becomes low, i.e., a characteristic in which the accelerator opening changes in a bell-shaped curve over time).

As described above, in this embodiment, when the accelerator opening reduces, the engine 10 is controlled while the target torque corresponding to the accelerator acceleration, which is obtained by using the accelerator characteristic maps according to the accelerator opening, is suitably limited by the torque change limit value which is obtained by using the deceleration smoothing control map. Thus, as indicated by the chart G16 of FIG. 11, the characteristic of the change of the jerk when the accelerator opening reduces, which correlates to the characteristic of the change of the jerk when the accelerator opening increases (see the chart G13), is suitably achieved.

<Control>

Figure 13:
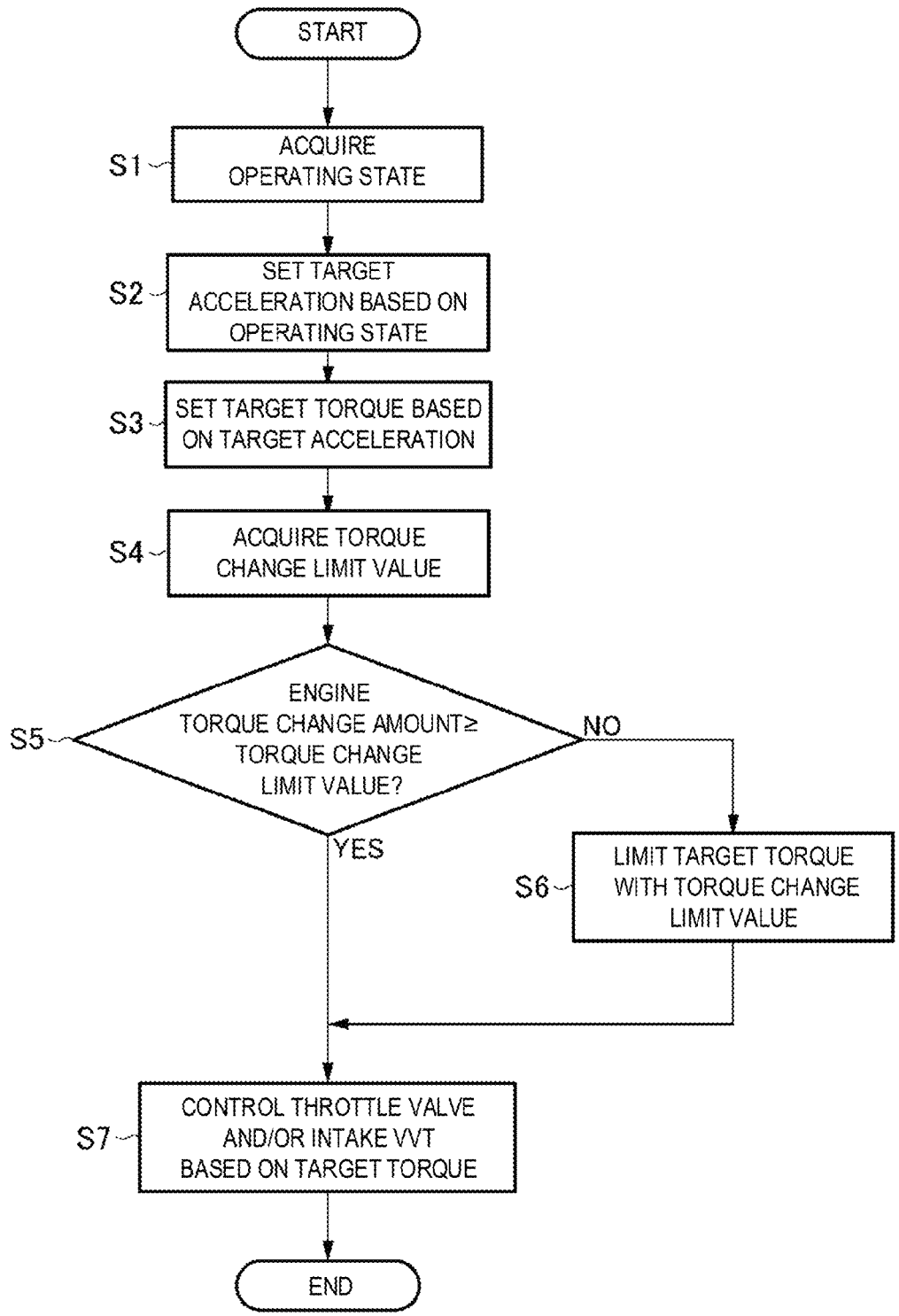
FIG. 13 is a flowchart illustrating an engine control according to the embodiment of the present invention.

Next, the engine control of this embodiment is described with reference to FIG. 13, which is a flowchart illustrating the engine control according to this embodiment. This flow is repeated at a predetermined time cycle by the ECU 50 of the engine system 100.

First at S1, the ECU 50 acquires an operating state of the vehicle. Specifically, the ECU 50 acquires, as the operating state of the vehicle, the accelerator opening detected by the accelerator opening sensor 30 (specifically, the accelerator opening acquired by the accelerator opening detecting module 50a of the ECU 50 based on the detection signal S30 outputted by the accelerator opening sensor 30), the vehicle speed detected by the vehicle speed sensor 39, the gear position currently set at the transmission 202, etc.

Next at S2, the target acceleration setting module 50b of the ECU 50 sets the target acceleration based on the accelerator opening, the vehicle speed, and the gear position acquired at S1. Specifically, the target acceleration setting module 50b selects an acceleration characteristic map corresponding to the current vehicle speed and the current gear position, from the acceleration characteristic maps defined for the various vehicle speeds and gear positions (the acceleration characteristic maps are created and stored in a memory or the like before use), such as those illustrated in FIGS. 5A to 5C. The target acceleration setting module 50b determines (sets) the target acceleration corresponding to the current accelerator opening by referring to the selected acceleration characteristic map.

Then, at S3, the engine control module 50c of the ECU 50 sets the target torque of the engine 10 so as to achieve the target acceleration set at S2. In this case, the engine control module 50c sets the target torque (latest target torque) based on the current vehicle speed, etc., because when the vehicle speed increases, the traveling resistance becomes high, and therefore, the latest target torque needs to be set high. Moreover, the engine control module 50c sets the latest target torque within a range that the engine 10 can output.

Subsequently, at S4, the engine control module 50c acquires the torque change limit value corresponding to the current engine torque and the difference between the previous target torque and the latest target torque set at S3, by referring to the deceleration smoothing control map designed before use (see FIG. 12).

Next at S5, the engine control module 50c determines whether the value of the change amount (basically a negative value) of the engine torque when the latest target torque set at S3 is applied is above the torque change limit value (basically a negative value) acquired at S4.

If the result of S5 indicates that the value of the change amount of the engine torque is above the torque change limit value (S5: YES), the control proceeds to S7. This result indicates that the target torque is not changed beyond the limitation defined by the torque change limit value. Thus, at S7, by using the latest target torque set at S3 as-is, the engine control module 50c controls the engine 10 to output the latest target torque as-is. Specifically, the engine control module 50c adjusts the opening of the throttle valve 5 and/or the operation timing of the intake valve 12 through the variable intake valve mechanism 18 (intake VVT control) by taking into consideration of the intake air amount detected by the airflow sensor 31, so that the air amount corresponding to the target torque is introduced into the engine 10. The engine control module 50c also controls the fuel injector 13 to inject the fuel injection amount determined based on the theoretical air-fuel ratio thereof with the air amount which corresponds to the target torque described above.

On the other hand, if the result of S5 indicates that the value of the change amount of the engine torque is the torque change limit value or below (S5: NO), the control proceeds to S6. This result indicates that the target torque is changed beyond the limitation defined by the torque change limit value. Thus, the engine control module 50c determines a torque obtained by applying the torque change limit value to be the target torque, instead of the target torque set at S3. Then at S7, the engine control module 50c controls the engine 10 to output the target torque to which the limitation by the torque change limit value is applied at S6. The engine 10 is controlled based on the target torque similarly to above.

Note that the processings at S4 to S6 are only performed when the accelerator opening reduces (during deceleration) and are not performed when the accelerator opening increases (during acceleration). In other words, when the accelerator opening increases, the control proceeds from S3 directly to S7.

<Operations and Effects>

Next, operations and effects of the control device for the engine of this embodiment are described.

According to this embodiment, the deceleration control is performed such that the characteristic of the change of the jerk produced due to the reduction of the accelerator opening correlates to the characteristic of the change of the jerk produced due to the increase of the accelerator opening. Note that the "increase of the accelerator opening" here is performed in the early half of the process of acceleration to a constant speed travel of the vehicle, and the "reduction of the accelerator opening" here is performed in the latter half of the process. Therefore, the acceleration feel and the deceleration feel provided to the driver can be matched with each other, and the unity between the driver and the vehicle can be improved.

Further, according to this embodiment, the change of the engine torque according to the target acceleration which is set by using the acceleration characteristic maps is limited so that the jerk produced in the vehicle when the accelerator opening reduces does not exceed the predetermined value. Thus, the sharp deceleration is suppressed and a response in transition of the deceleration can be improved. Additionally, the characteristic of the change of the jerk when the accelerator opening reduces can be made to correlate more to the characteristic of the change of the jerk when the accelerator opening increases.

Particularly, according to this embodiment, the torque change limit value for limiting the change of the engine torque is set based on the current engine torque and the change of the engine torque within the time period, by using the deceleration smoothing control map. Therefore, the characteristic of the change of the jerk when the accelerator opening reduces can effectively be brought closer to the characteristic of the change of the jerk when the accelerator opening increases, while suppressing the sharp deceleration.

On the other hand, in this embodiment, the target acceleration is set according to the accelerator opening to cause the jerk, when the accelerator opening is increased from a state where the target acceleration is set to zero: to increase to a predetermined highest value at a first change rate as the accelerator opening increases; to substantially be fixed regardless of the increase of the accelerator opening within the predetermined range of the accelerator opening exceeding the accelerator opening at which the jerk reaches the highest value; and to reduce at a second change rate as the accelerator opening increases above the predetermined range, the second change rate being lower than the first change rate. By changing the jerk according to the increase of the accelerator opening as above, during the acceleration of the vehicle, both the quick acceleration feel and the linear acceleration feel can suitably be obtained. According to this embodiment, the change mode of the jerk produced when the accelerator opening reduces can suitably be made to correlate to the change mode of the jerk produced when the accelerator opening increases, which achieves both the quick acceleration feel and the linear acceleration feel.

<Modifications>

In the above embodiment, the configuration in which the present invention is applied to the engine 10 which is a gasoline engine (see FIG. 2); however, the present invention is not limited to be applied to the gasoline engine, and may similarly be applied to a diesel engine.

Further, in the above embodiment, based on the quadratic function, the jerk is reduced as the accelerator opening increases; however, it is not limited to using such a quadratic function, and various functions (e.g., exponential function and trigonometric function) may be used to reduce the jerk as the accelerator opening increases. In this case, a function based on which the jerk can gently be reduced compared to a configuration of linearly reducing the jerk may be applied.

Further in the above embodiment, the engine torque according to the target acceleration which is set by using the acceleration characteristic maps is limited so that the jerk produced in the vehicle when the accelerator opening reduces does not exceed the predetermined value; however, alternatively, the target acceleration set by using the acceleration characteristic maps may directly be limited so that the jerk produced when the accelerator opening reduces does not exceed the predetermined value. In this case, the target torque may be set based on the limited target acceleration to control the engine 10.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Intake Passage
5 Throttle Valve
10 Engine
13 Fuel Injector
18 Variable Intake Valve Mechanism
25 Exhaust Passage
29 Accelerator Pedal (Accelerator)
30 Accelerator Opening Sensor
39 Vehicle Speed Sensor
50 ECU
50a Accelerator Opening Detecting Module
50b Target Acceleration Setting Module
50c Engine Control Module
100 Engine System

What is claimed is:

1. A control device for an engine, comprising:
   a processor configured to execute:
   an accelerator opening detector for detecting an opening of an accelerator;
   a target acceleration setter for setting a target acceleration of a vehicle based on the accelerator opening detected by the accelerator opening detector; and
   an engine controller for adjusting an engine torque to achieve the target acceleration set by the target acceleration setter,
   wherein the target acceleration setter sets the target acceleration such that a characteristic of a change of a jerk produced in the vehicle due to a reduction of the accelerator opening correlates to a characteristic of a change of a jerk produced in the vehicle due to an increase of the accelerator opening, the increase of the accelerator opening performed in an early half of a process of acceleration to a constant speed travel of the vehicle, the reduction of the accelerator opening performed in a latter half of the process.

2. The control device of claim 1, wherein the characteristic of the change of the jerk produced due to the reduction of the accelerator opening correlates to the characteristic of the change of the jerk produced due to the increase of the accelerator opening in a mode in which the changes of the jerks are similar to each other in a time axis while directions of the changes perpendicular to the time axis are opposite to each other.

3. The control device of claim 2, further comprising a limiter for limiting the jerk produced in the vehicle not to exceed a predetermined value of the jerk, when the accelerator opening reduces.

4. The control device of claim 3, wherein the limiter is executed by the processor, and
   wherein the engine controller limits a change of an engine torque that is caused according to the target acceleration set by the target acceleration setter, to prevent the jerk produced in the vehicle when the accelerator opening reduces from exceeding the predetermined value.

5. The control device of claim 4, wherein the engine controller sets a limit value for a change amount of the engine torque based on a current engine torque and a change amount of the engine torque within a predetermined period of time, and the engine controller limits the change of the engine torque by using the limit value.

6. A control device for an engine, comprising:
a processor configured to execute:
an accelerator opening detector for detecting an opening of an accelerator;
a target acceleration setter for setting a target acceleration of a vehicle based on the accelerator opening detected by the accelerator opening detector; and
an engine controller for adjusting an engine torque to achieve the target acceleration set by the target acceleration setter,
wherein the target acceleration setter sets the target acceleration such that a characteristic of a change of a jerk produced in the vehicle due to a reduction of the accelerator opening correlates to a characteristic of a change of a jerk produced in the vehicle due to an increase of the accelerator opening, the target acceleration set to cause the jerk, when the accelerator opening is increased from a state where the target acceleration is set to zero:
to increase to a predetermined highest value at a first change rate as the accelerator opening increases;
to substantially be fixed regardless of an increase of the accelerator opening within a predetermined range of the accelerator opening exceeding an accelerator opening at which the jerk reaches the highest value; and
to reduce at a second change rate as the accelerator opening increases above the predetermined range, the second change rate being lower than the first change rate.

* * * * *